(12) United States Patent
Koide et al.

(10) Patent No.: US 9,941,050 B2
(45) Date of Patent: Apr. 10, 2018

(54) MULTILAYER CERAMIC CAPACITOR

(71) Applicant: TAIYO YUDEN CO., LTD., Taito-ku, Tokyo (JP)

(72) Inventors: Kazuyuki Koide, Takasaki (JP); Takahisa Fukuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/888,403

(22) PCT Filed: Jun. 19, 2014

(86) PCT No.: PCT/JP2014/066223
§ 371 (c)(1),
(2) Date: Oct. 30, 2015

(87) PCT Pub. No.: WO2014/203948
PCT Pub. Date: Dec. 24, 2014

(65) Prior Publication Data
US 2016/0099108 A1 Apr. 7, 2016

(30) Foreign Application Priority Data

Jun. 19, 2013 (JP) .................................. 2013-128512
Jun. 16, 2014 (JP) .................................. 2014-123023

(51) Int. Cl.
*H01G 4/30* (2006.01)
*H01G 4/06* (2006.01)
*H01G 4/012* (2006.01)
*H01G 4/224* (2006.01)
*H01G 4/12* (2006.01)
*H01G 2/06* (2006.01)

(52) U.S. Cl.
CPC ............... *H01G 4/012* (2013.01); *H01G 2/06* (2013.01); *H01G 4/12* (2013.01); *H01G 4/224* (2013.01); *H01G 4/30* (2013.01)

(58) Field of Classification Search
CPC ............ H01G 4/30; H01G 4/232; H01G 4/12; H01G 4/012; H01G 4/224
USPC ........................ 361/321.1, 301.4, 321.2, 304
See application file for complete search history.

(56) References Cited

U.S. PATENT DOCUMENTS

2012/0300361 A1* 11/2012 Togashi ................... H01G 4/30
361/301.4
2013/0038979 A1* 2/2013 Togashi ................... H01G 4/30
361/301.4

FOREIGN PATENT DOCUMENTS

| JP | 8130160 A | 5/1996 |
| JP | 11251186 A | 9/1999 |
| JP | 2004193352 A | 7/2004 |
| JP | 2005347288 A | 12/2005 |

(Continued)

OTHER PUBLICATIONS

International Search Report (ISR) dated Aug. 5, 2014, issued for International application No. PCT/JP2014/066223.

*Primary Examiner* — Eric Thomas
*Assistant Examiner* — Arun Ramaswamy
(74) *Attorney, Agent, or Firm* — Law Office of Katsuhiro Arai

(57) ABSTRACT

A multilayer ceramic capacitor has a capacitor body of laminate structure and a pair of external electrodes, and shaped roughly as a rectangular solid defined by length L, width W, and height H. This multilayer ceramic capacitor is such that the width W and height H meet the condition of "$1.10 \leq H/W \leq 1.70$."

5 Claims, 4 Drawing Sheets

(56) References Cited

FOREIGN PATENT DOCUMENTS

JP         2012248581 A    12/2012
JP         2012248846 A    12/2012

* cited by examiner

[Fig. 1]
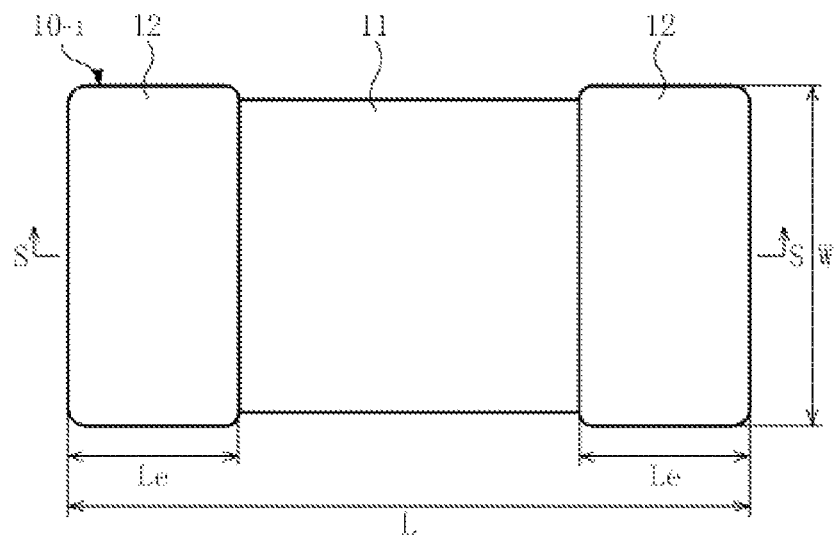
[Fig. 2]
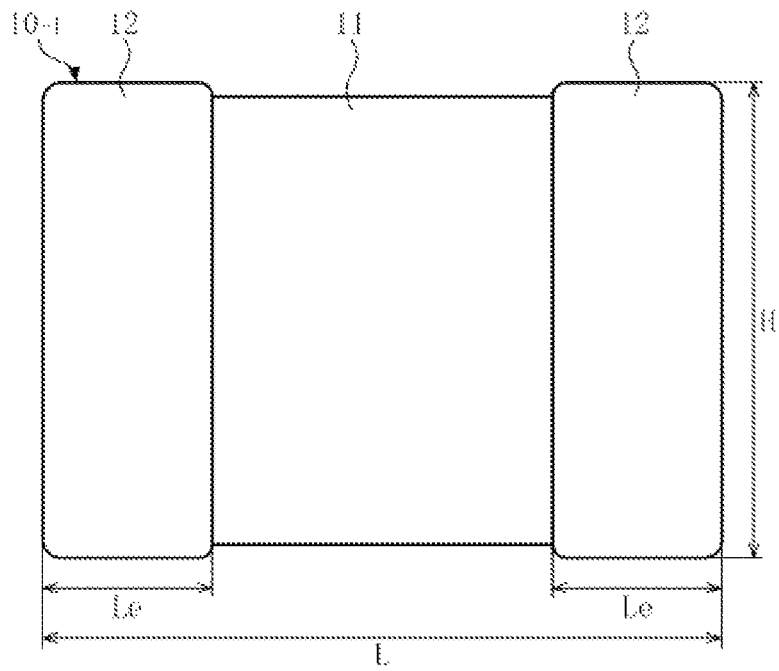

[Fig. 3]
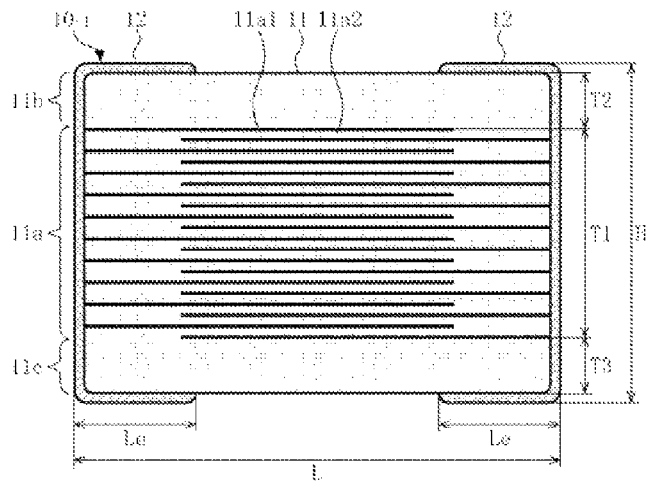
[Fig. 4]
| sample | H | H/W | LC | Ti | TA | T1 | EC | FT | BS |
|---|---|---|---|---|---|---|---|---|---|
| No. 1 | 500μm | 1.00 | 11-37-11 | 1.0μm | 8.0μm | 320μm | 10.0nF | 13.0v/μm | 5/100 |
| No. 2 | 550μm | 1.10 | 11-43-11 | 1.0μm | 8.0μm | 370μm | 11.6nF | 13.0v/μm | 2/100 |
| No. 3 | 600μm | 1.20 | 11-49-11 | 1.0μm | 8.0μm | 420μm | 13.2nF | 13.0v/μm | 1/100 |
| No. 4 | 650μm | 1.30 | 11-55-11 | 1.0μm | 8.0μm | 470μm | 14.8nF | 13.0v/μm | 0/100 |
| No. 5 | 700μm | 1.40 | 11-61-11 | 1.0μm | 8.0μm | 520μm | 16.4nF | 13.0v/μm | 0/100 |
| No. 6 | 750μm | 1.50 | 11-67-11 | 1.0μm | 8.0μm | 570μm | 18.1nF | 13.0v/μm | 0/100 |
| No. 7 | 800μm | 1.60 | 11-73-11 | 1.0μm | 8.0μm | 620μm | 19.7nF | 13.0v/μm | 0/100 |
| No. 8 | 850μm | 1.70 | 11-79-11 | 1.0μm | 8.0μm | 670μm | 21.3nF | 13.0v/μm | 0/100 |
| No. 9 | 900μm | 1.80 | 11-85-11 | 1.0μm | 8.0μm | 720μm | 22.9nF | 13.0v/μm | 0/100 |
| No. 10 | 790μm | 1.58 | 11-54-11 | 1.0μm | 11.3μm | 610μm | 10.0nF | 8.8v/μm | 0/100 |
[Fig. 5]
| sample | H | H/W | GA | | | |
|---|---|---|---|---|---|---|
| | | | 75μm | 50μm | 25μm | 10μm |
| No. 1 | 500μm | 1.00 | ○ | ○ | ○ | ○ |
| No. 2 | 550μm | 1.10 | ○ | ○ | ○ | ○ |
| No. 3 | 600μm | 1.20 | ○ | ○ | ○ | ○ |
| No. 4 | 650μm | 1.30 | ○ | ○ | ○ | ○ |
| No. 5 | 700μm | 1.40 | ○ | ○ | ○ | ○ |
| No. 6 | 750μm | 1.50 | ○ | ○ | ○ | ○ |
| No. 7 | 800μm | 1.60 | ○ | ○ | ○ | ○ |
| No. 8 | 850μm | 1.70 | △ | △ | ○ | ○ |
| No. 9 | 900μm | 1.80 | × | △ | ○ | ○ |

[Fig. 6]
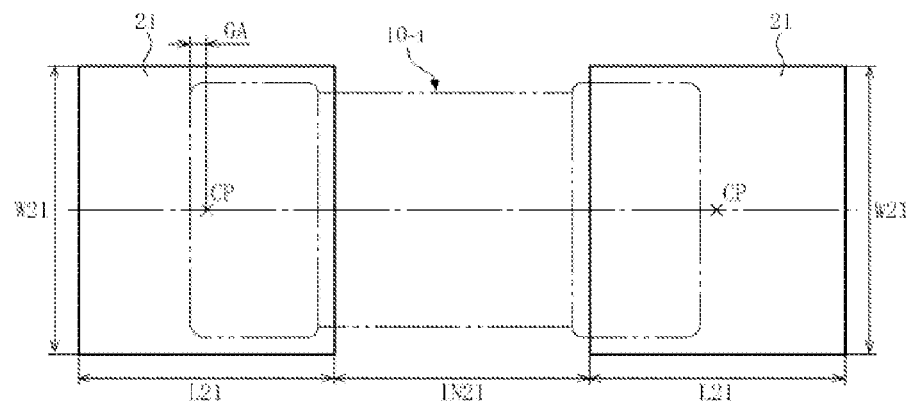
[Fig. 7]
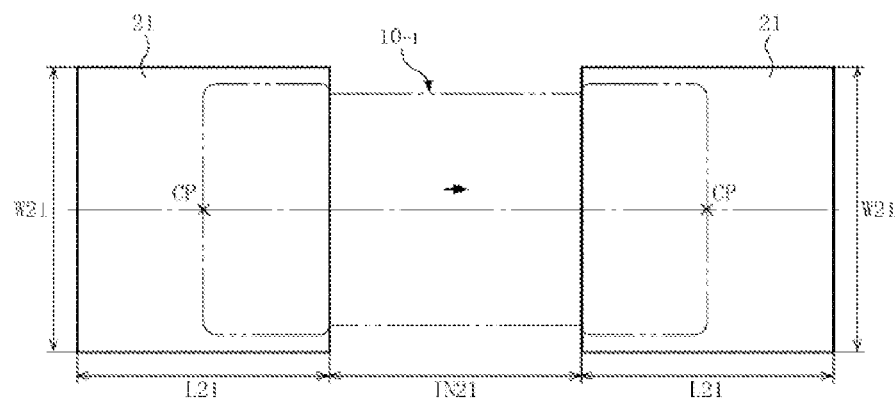
[Fig. 8]
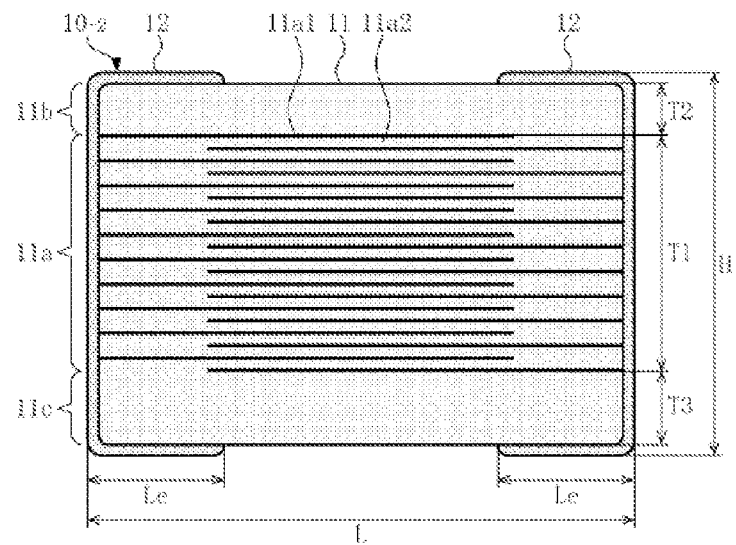

[Fig. 9]

| sample | H | H/W | LC | Ti | Td | T3 | T3/T2 | (T3-T2)/H | BS |
|---|---|---|---|---|---|---|---|---|---|
| No. 2 | 550μm | 1.10 | 11-43-11 | 1.0μm | 8.0μm | 88μm | 1.00 | — | 2/100 |
| No. 11 | 566μm | 1.13 | 11-43-13 | 1.0μm | 8.0μm | 104μm | 1.18 | 0.028 | 0/100 |
| No. 12 | 574μm | 1.15 | 11-43-14 | 1.0μm | 8.0μm | 112μm | 1.27 | 0.042 | 0/100 |
| No. 13 | 598μm | 1.20 | 11-43-17 | 1.0μm | 8.0μm | 136μm | 1.55 | 0.080 | 0/100 |
| No. 14 | 630μm | 1.26 | 11-43-21 | 1.0μm | 8.0μm | 168μm | 1.91 | 0.127 | 0/100 |
| No. 15 | 654μm | 1.31 | 11-43-24 | 1.0μm | 8.0μm | 192μm | 2.18 | 0.159 | 0/100 |
| No. 16 | 678μm | 1.36 | 11-43-27 | 1.0μm | 8.0μm | 216μm | 2.45 | 0.189 | 0/100 |
| No. 17 | 702μm | 1.40 | 11-43-30 | 1.0μm | 8.0μm | 240μm | 2.73 | 0.217 | 0/100 |
| No. 18 | 734μm | 1.47 | 11-43-34 | 1.0μm | 8.0μm | 272μm | 3.09 | 0.251 | 0/100 |
| No. 19 | 758μm | 1.52 | 11-43-37 | 1.0μm | 8.0μm | 296μm | 3.36 | 0.274 | 0/100 |
| No. 20 | 782μm | 1.56 | 11-43-40 | 1.0μm | 8.0μm | 320μm | 3.64 | 0.297 | 0/100 |
| No. 21 | 808μm | 1.62 | 11-43-42 | 1.0μm | 8.0μm | 336μm | 3.82 | 0.307 | 0/100 |
| No. 22 | 832μm | 1.66 | 11-43-45 | 1.0μm | 8.0μm | 360μm | 4.09 | 0.327 | 0/100 |
| No. 23 | 846μm | 1.69 | 11-43-48 | 1.0μm | 8.0μm | 384μm | 4.36 | 0.350 | 0/100 |

US 9,941,050 B2

MULTILAYER CERAMIC CAPACITOR

This application is the U.S. National Phase under 35 U.S.C. § 371 of International Application PCT/JP2014/066223, filed Jun. 19, 2014, which claims priority to Japanese Patent Application No. 2013-128512, filed Jun. 19, 2013 and 2014-123023, filed Jun. 16, 2014. The International Application was published under PCT Article 21(2) in a language other than English.

TECHNICAL FIELD

The present invention relate to a multilayer ceramic capacitor.

BACKGROUND ART

A multilayer ceramic capacitor generally has a capacitor body of laminate structure and a pair of external electrodes, and shaped roughly as a rectangular solid defined by the length, width, and height. The electrostatic capacitance of such multilayer ceramic capacitor is ensured by the capacitive part, or specifically the part where multiple internal electrode layers are stacked with ceramic layers in between, of the capacitor body.

Multilayer ceramic capacitors of this type continue to face demand for smaller mounting area to support high density mounting and also for larger capacitance. This demand for larger capacitance is generally addressed by a technique of making the internal electrode layers thinner to increase the number of layers, but given the fact that the internal electrode layers are already as thin as in μm order, further thickness reduction is physically limited.

Another technique to address the demand for larger capacitance involves integrally stacking multiple multilayer ceramic capacitors (refer to Patent Literature 1 cited below). However, this technique requires that multiple multilayer ceramic capacitors be stacked and joined together and also a pair of terminals be provided, which unavoidably increases the unit price substantially due to higher cost. In addition, integrally stacking laminated capacitors that may be used individually causes the integral stack to become higher than necessary.

On the other hand, making the multilayer ceramic capacitor higher than it is wide in order to increase the number of internal electrode layers is another idea in addressing the demand for larger capacitance. However, multilayer ceramic capacitors meeting the condition of "Height>Width" presents a concern that self-alignment effect will become difficult to achieve when they are mounted on circuit boards, etc., compared to multilayer ceramic capacitors meeting the condition of "Height=Width" or "Height<Width."

In other words, when adopting the idea of making the multilayer ceramic capacitor higher than it is wide in order to address the demand for larger capacitance, it is absolutely essential that conditions for mounting it on a circuit board, etc., in a favorable manner be identified.

BACKGROUND ART LITERATURE

Patent Literature

Patent Literature 1: Japanese Patent Laid-open No. Hei 11-251186

SUMMARY OF THE INVENTION

Problems to Be Solved by the Invention

An object of the present invention is to provide a multilayer ceramic capacitor that meets the condition of "Height>Width" and can still be mounted on a circuit board, etc., in a favorable manner.

Means for Solving the Problems

To achieve the aforementioned object, the present invention provides a multilayer ceramic capacitor having a capacitor body of laminate structure and a pair of external electrodes, and shaped roughly as a rectangular solid defined by the length L, width W, and height H, wherein the width W and height H meet the condition of "$1.10 \leq H/W \leq 1.70$."

Effects of the Invention

According to the present invention, a multilayer ceramic capacitor can be provided that meets the condition of "Height>Width" and can still be mounted on a circuit board, etc., in a favorable manner.

BRIEF DESCRIPTION OF THE DRAWINGS

FIG. 1 is a top view of a multilayer ceramic capacitor to which the present invention is applied (first embodiment).

FIG. 2 is a side view, in the width direction, of the multilayer ceramic capacitor shown in FIG. 1.

FIG. 3 is a longitudinal section view of FIG. 1 cut along line S-S.

FIG. 4 is a table showing the specifications and characteristics (electrostatic capacitance, field intensity, and bending strength) of Verification Samples No. 1 to No. 10.

FIG. 5 is a table showing the self-alignment effects of Verification Samples No. 1 to No. 9 shown in FIG. 4.

FIG. 6 is a drawing explaining a method for checking the self-alignment effect.

FIG. 7 is a drawing explaining a method for checking the self-alignment effect.

FIG. 8 is a longitudinal section view of a multilayer ceramic capacitor to which the present invention is applied (second embodiment), corresponding to FIG. 3.

FIG. 9 is a table showing the specifications and characteristics (bending strength) of Verification Samples No. 11 to No. 23.

MODE FOR CARRYING OUT THE INVENTION

First Embodiment

FIG. 1 to FIG. 3 show a multilayer ceramic capacitor 10-1 to which the present invention is applied (first embodiment). This multilayer ceramic capacitor 10-1 has a capacitor body 11 of laminate structure and a pair of external electrodes 12, and is shaped roughly as a rectangular solid defined by the length L, width W, and height H. Also, this multilayer ceramic capacitor 10-1 meets the condition of "Height H>Width W," or more specifically the condition of "Length L>Height H>Width W."

The capacitor body 11 has a capacitive part 11b where multiple internal electrode layers 11a1 are stacked with ceramic layers 11a2 in between, a first protective part 11b made of ceramics, and a second protective part 11c made of ceramics, which are layered in the order of first protective part 11b—capacitive part 11a—second protective part 11c in the height direction. This capacitor body 11, too, is shaped roughly as a rectangular solid defined by the length, width, and height, meeting the condition of "Height>Width," or more specifically the condition of "Length>Height>Width." This capacitor body 11 also meets the condition of "Thickness T2 of the first protective part 11b=Thickness T3 of the second protective part 11c," or more specifically the condition of "Thickness T1 of the capacitive part 11a>Thickness T2 of the first protective part 11b=Thickness T3 of the second protective part 11c."

The multiple internal electrode layers 11a1 (20 layers in the figure) included in the capacitive part 11a each have a roughly uniform rectangular profile shape as well as a roughly uniform thickness. Also, the ceramic layers 11a2 present between the adjacent internal electrode layers 11a1 (layers including those sandwiched between the adjacent internal electrode layers 11a1 and those present at both ends in the length direction and not sandwiched; 19 layers in the figure) each have a roughly uniform profile shaped as a rectangle larger than the profile shape of the internal electrode layer 11a1, as well as a roughly uniform thickness. The multiple internal electrode layers 11a1 are staggered in the length direction, and the edges of odd-numbered internal electrode layers 11a1 from the top in FIG. 3 are electrically connected to one (left side in FIG. 3) of the external electrodes 12, while the edges of even-numbered internal electrode layers 11a1 from the top in FIG. 3 are electrically connected to the other one (right side in FIG. 3) of the external electrodes 12.

The multiple internal electrode layers 11a1 included in the capacitive part 11a are each constituted by a conductor whose composition is roughly the same. For this conductor, preferably a good conductor whose primary component is nickel, copper, palladium, platinum, silver, gold, or alloy thereof, among others, may be used. Here, "conductor whose composition is roughly the same" refers to a conductor whose composition is the same or whose composition is slightly different within an allowable range due to its relationship with the sintering level, etc. In addition, the ceramic layers 11a2 present between the adjacent internal electrode layers 11a1, including the first protective part 11b and second protective part 11c, are each constituted by ceramics whose composition is roughly the same and whose dielectric constant is also roughly the same. For this ceramics, preferably dielectric ceramics, or more preferably dielectric ceramics of $\varepsilon$>1000 or Class 2 (high dielectric constant type), whose primary component is barium titanate, strontium titanate, calcium titanate, magnesium titanate, calcium zirconate, calcium titanate zirconate, barium zirconate, titanium oxide, etc., may be used. Here, "ceramics whose composition is roughly the same and whose dielectric constant is also roughly the same" refers to ceramics whose composition and dielectric constant are the same or ceramics at least one of whose composition and dielectric constant is slightly different within an allowable range due to its relationship with the sintering level, etc.

Each external electrode 12 is provided in a manner covering an end face of the capacitor body 11 in the length direction as well as parts of the four side surfaces adjoining the end face. In FIG. 1 to FIG. 3, Le indicates the length of each external electrode 12 covering parts of the four side surfaces of the capacitor body 11. Although not illustrated, each external electrode 12 has a double-layer structure comprising a base film adhering to the exterior surface of the capacitor body 11 and a surface film adhering to the exterior surface of the base film, or a multi-layer structure comprising a base film, surface film, and at least one intermediate film in between. The base film is constituted by a baked film, for example, and for the baked film, preferably a good conductor whose primary component is nickel, copper, palladium, platinum, silver, gold, or alloy thereof, among others, may be used. The surface film is constituted by a plating film, for example, and for the plating film, preferably a good conductor whose primary component is tin, palladium, gold, zinc, or alloy thereof, among others, may be used. The intermediate film is constituted by a plating film, for example, and for the plating film, preferably a good conductor whose primary component is platinum, palladium, gold, copper, nickel, or alloy thereof, among others, may be used.

The multilayer ceramic capacitor 10-1 shown in FIG. 1 to FIG. 3 meets the condition of "1.10≤Height H/Width W≤1.70," or preferably the condition of "1.30≤Height H/Width W≤1.60." The significance of these conditions will be described in detail later.

Here, a favorable example of manufacturing the multilayer ceramic capacitor 10-1 shown in FIG. 1 to FIG. 3 is presented. If the primary component of the ceramic layer 11a2 in the capacitive part 11a and of the first protective part 11b and second protective part 11c is barium titanate, and the primary component of the internal electrode layer 11a1 in the capacitive part 11a is nickel, then first of all a ceramic slurry containing barium titanate powder, ethanol (solvent), polyvinyl butyral (binder), and additives such as dispersant, is prepared, along with an electrode paste containing nickel powder, terpineol (solvent), ethyl cellulose (binder), and additives such as dispersant.

Then, using a die coater or other coating machine and a drying machine, the ceramic slurry is coated onto a carrier film and then dried, to produce a first green sheet. Additionally, using a screen printer or other printing machine and a drying machine, the electrode paste is printed onto the first green sheet in zigzag or matrix patterns and then dried, to produce a second green sheet on which internal electrode layer patterns are formed.

Then, using a pickup head with stamping blade and heater or other laminating machine, unit sheets stamped from the first green sheet are stacked together until the specified number is reached, after which the stacked sheets are thermally bonded to produce a part corresponding to the second protective part 11c. Next, unit sheets stamped from the second green sheet (including internal electrode layer patterns) are stacked together until the specified number is reached, after which the stacked sheets are thermally bonded to produce a part corresponding to the capacitive part 11a. Next, unit sheets stamped from the first green sheet are stacked together until the specified number is reached, after which the stacked sheets are thermally bonded to produce a part corresponding to the first protective part 11b. Then, using a hot hydrostatic press or other final bonding machine, the stacked and thermally bonded sheets are finally bonded to produce an unsintered laminated sheet.

Then, using a dicer or other cutting machine, the unsintered laminated sheet is cut in a lattice pattern to produce unsintered chips each corresponding to the capacitor body 11. Then, using a tunnel-type sintering furnace or other sintering machine, the many unsintered chips are each sintered (and the binder removed) in a reducing ambience or ambience of low partial oxygen pressure, based on a temperature profile according to barium titanate and nickel, to produce a sintered chip corresponding to the capacitor body 11.

Then, using a roller coater or other coating machine, an electrode paste (the electrode paste for internal electrode layers is carried over) is coated on both ends of the sintered chip in the length direction and then baked in an ambience similar to the ones mentioned above, to form a base film, on top of which a surface film, or an intermediate film and surface film, is/are formed by electrolytic plating or other plating treatment, to produce external electrodes. The base film of the external electrodes may also be produced by coating the electrode paste on both ends of the unsintered chip in the length direction and then dried, and simultaneously sintering it with the unsintered chip.

FIG. 4 shows the specifications and characteristics (electrostatic capacitance EC, field intensity FI and bending strength BS) of Verification Samples No. 1 to No. 10. These Samples No. 1 to No. 10 were produced according to the aforementioned manufacturing example, where the primary component of the internal electrode layer 11a1 in the capacitive part 11a is nickel, while the primary component of the ceramic layer 11a2 in the capacitive part 11a and of the first protective part 11b and second protective part 11c is barium titanate, and each external electrode 12 has a triple-layer structure comprising a base film whose primary component is nickel, intermediate film whose primary component is copper, and surface film whose primary component is tin.

Samples No. 1 to No. 9 are identical in that the length L is 1000 µm; width W is 500 µm; thickness T2 of the first protective part 11b is 88 µm; number of ceramic layers comprising the first protective part 11b (value shown on the left side in the layer constitution LC field) is 11; thickness T3 of the second protective part 11c is 88 µm; number of ceramic layers comprising the second protective part 11c (value shown on the right side in the layer constitution LC field) is 11; thickness Ti of the internal electrode layer 11a1 in the capacitive part 11a is 1.0 µm; thickness Td of the ceramic layer 11a2 in the capacitive part 11a, thickness Td of the ceramic layer constituting the first protective part 11b, and thickness Td of the ceramic layer constituting the second protective part 11c, are all 8.0 µm; thickness of each external electrode 12 is 10 µm; and length Le of the part covering parts of the four side surfaces of the capacitor body 11 (refer to FIG. 1 to FIG. 3) is 250 µm; however, the thickness T1 and height H of the capacitive part 11a are increasingly larger as the value shown at the center in the layer constitution LC field (sum of the number of internal electrode layers 11a1 and number of ceramic layers 11a2) increases.

To give supplemental explanation for the description (n1–m–n2) in the layer constitution LC field, n1 indicates the number of ceramic layers constituting the first protective part 11b, m indicates the sum of the number of internal electrode layers 11a1 and number of ceramic layers 11a2 in the capacitive part 11a, and n2 indicates the number of ceramic layers constituting the second protective part 11c. The basis for these layer numbers is the number of layers stacked in the stacking step of the aforementioned manufacturing example. In addition, m is such that (m−1)/2+1 corresponds to the number of internal electrode layers 11a1, while (m−1)/2 corresponds to the number of ceramic layers 11a2. Simple calculation based on m in the layer constitution LC field, thickness Ti, and thickness Td generates an error between the calculated value and the thickness T1 of the capacitive part 11a; however, this error is due to the fact that, in the stacking step of the aforementioned manufacturing example, the internal electrode layer patterns which would become the internal electrode layers 11a1 are partially embedded in the green sheet which will become the ceramic layers 11a2.

Of Samples No. 1 to No. 9, Samples No. 2 to No. 9 meet the condition of "Height H>Width W," but Sample No. 1 does not meet this condition because its height H and width W are the same. In other words, Sample No. 1 represents a conventional multilayer ceramic capacitor, while Samples No. 2 to No. 9 represent multilayer ceramic capacitors corresponding to the multilayer ceramic capacitor 10-1 shown in FIG. 1 to FIG. 3.

Sample No. 10 is different from Samples No. 1 to No. 9 mentioned above in that the thickness Td of the ceramic layer 11a2 in the capacitive part 11a, thickness Td of the ceramic layer constituting the first protective part 11b, and thickness Td of the ceramic layer constituting the second protective part 11c, are all 11.3 µm; thickness T2 of the first protective part 11b is 124.3 µm; and thickness T3 of the second protective part 11c is 124.3 µm. In other words, Sample No. 10 represents a multilayer ceramic capacitor corresponding to the multilayer ceramic capacitor 10-1 shown in FIG. 1 to FIG. 3, because it meets the condition of "Height H>Width W" although its thickness Td is different.

Here, the methods for measuring the electrostatic capacitance EC, field intensity FI, and bending strength BS shown in FIG. 4 are explained. For the electrostatic capacitance EC shown in FIG. 5, 100 pieces were prepared for each of Samples No. 1 to No. 10 and the electrostatic capacitance of each sample piece was measured using the HP4284A (manufactured by Agilent), to calculate the average for each sample piece. On the other hand, the field intensity FI shown in FIG. 4 was calculated from the thickness Td of the ceramic layer at the rated voltage (100 V).

Furthermore, for the bending strength BS shown in FIG. 4, 100 pieces were prepared for each of Samples No. 1 to No. 10 and each sample piece was soldered on one side of a glass epoxy board conforming to JIS-C-6484, and then, using small parts to support the points 45 mm to both sides from the soldered location of the sample piece on the one side of the glass epoxy board, the area on the other side corresponding to the soldered location of the sample piece was pressed down by 10 mm at a constant speed of 0.5 mm/sec using a jig (whose pressuring part consists of a curved surface of 230 mm in radius of curvature) to deform the sample piece, and the number of times the capacitance of the sample piece dropped by 12.5% or more during the process of deformation was counted for each sample piece.

FIG. 5 shows the self-alignment effects of Verification Samples No. 1 to No. 9. As mentioned earlier, Sample No. 1 represents a conventional multilayer ceramic capacitor, while Samples No. 2 to No. 9 represent a multilayer ceramic capacitor corresponding to the multilayer ceramic capacitor 10-1 shown in FIG. 1 to FIG. 3.

Here, the method for checking the self-alignment effect shown in FIG. 5 is explained by citing FIG. 6 and FIG. 7. First, 80 pieces are prepared for each of Samples No. 1 to No. 9, along with 36 test boards. Formed on each test board are 20 pairs of two rectangular conductor pads 21 of 500 µm in length L21 and 550 µm in width W21, which are arranged at an interval IN21 of 500 µm between two pads (refer to FIG. 6). In FIG. 6 and FIG. 7, "X" represents the center CP of each conductor pad 21, while the one-dot chain line indicates the centerline passing through the paired conductor pads 21 in the width direction.

Next, cream solder is applied to a thickness of 0.20 mm on the top surface of each of the conductor pads 21 on four test boards, and then pieces of Sample No. 1 are installed on the paired conductor pads 21 via the cream solder (20 pieces are installed on one board). When installing 20 pieces of Sample No. 1 on one test board, the centerline of each piece of sample No. 1 in the width direction is aligned with the centerline passing through the paired conductor pads 21 in the width direction, while the external electrodes 12 of each piece of Sample No. 1 are positioned in such a way that a gap GA of 75 μm is created between the end face of each external electrode and the center CP of the conductor pad 21 (refer to FIG. 6). The aforementioned gap GA is adjusted to 50 μm when installing 20 pieces of Sample No. 1 on the second test board, the aforementioned gap GA is adjusted to 25 μm when installing 20 pieces of Sample No. 1 on the third test board, and the aforementioned gap GA is adjusted to 10 μm when installing 20 pieces of Sample No. 1 on the fourth test board (refer to the gap GA in FIG. 5). The pieces of each of other Samples No. 2 to No. 9 are installed on four test boards, respectively, in the same manner as with Sample No. 1.

Next, the total of 36 test boards on which the pieces of Samples No. 1 to No. 9 have been installed are heat-treated by reflow soldering, etc., to join the external electrodes 12 of the installed pieces of Samples No. 1 to No. 9, respectively, to the conductor pads 21 via solder. Then, an optical microscope is used to check each test board to see whether or not the aforementioned gap GA has become zero (whether or not the self-alignment effect has been achieved) during the course of heat treatment (refer to FIG. 7).

Next, based on the check results, a score of "Very effective" (refer to "O" in FIG. 5) is given if the self-alignment effect has been achieved on 20 out of the 20 sample pieces (No. 1 to No. 9) on the four types of test boards with different gaps GA, a score of "Moderately effective" (refer to "Δ" in FIG. 5) is given if the self-alignment effect has been achieved on 19 to 14 pieces, and a score of "Not very effective" (refer to "X" in FIG. 5) is given if the self-alignment effect has been achieved on 13 or fewer pieces.

The following explains the effects that can be achieved by the multilayer ceramic capacitor 10-1 shown in FIG. 1 to FIG. 3 by taking into account the specifications and characteristics (electrostatic capacitance EC, field intensity FI, and bending strength BS) shown in FIG. 4 as well as the self-alignment effect shown in FIG. 5.

First, the electrostatic capacitances EC of Samples No. 2 to No. 9 increase more than the electrostatic capacitance EC of Sample No. 1 shown in FIG. 4 as the height H increases. This increase in electrostatic capacitance EC is due to the increase in the number of layers (number of internal electrode layers 11a1) in the capacitive part 11a, but given the trend of increase in electrostatic capacitance EC exhibited by Samples No. 2 to No. 9, it can be said that capacitance increase is possible without increasing the height H very much. In other words, an electrostatic capacitance EC of twice that of Sample No. 1 or more can be easily ensured at a height H lower than when two pieces of Sample No. 1 are integrally stacked to achieve larger capacitance.

Second, the bending strengths BS of Samples No. 2 to No. 9 improve more than the bending strength BS of Sample No. 1 shown in FIG. 4 as the height H increases. While the bending strength BS of Sample No. 2 is 2/100, this value does not present any serious problem in actual mounting, which means that this capacitor can be mounted on a circuit board, etc., in a favorable manner so long as its width W and height H meet the condition of "1.10≤Height H/Width W." Also considering that Samples No. 4 to No. 9 all have a bending strength BS of 0/100, this capacitor can be mounted on a circuit board, etc., in a more favorable manner so long as its width W and height H meet the condition of "1.30≤Height H/Width W."

Third, the field intensity FI of Sample No. 10 shown in FIG. 4 drops more than that in Sample No. 1, naturally, but also more than those in Samples No. 2 to No. 9. This drop in field intensity FI depends on the thickness Td of the ceramic layer 11a2 in the capacitive part 11a, which means that the withstand voltage can be easily improved by making the height H of the capacitor greater than its width W.

Fourth, compared to the self-alignment effect of Sample No. 9 shown in FIG. 5, the self-alignment effects of Samples No. 2 to No. 8 are better. Since the self-alignment effects of Sample No. 8 pieces include "Moderately effective" (Δ), these scores do not present any serious problem in actual mounting, which means that the capacitor can be mounted on a circuit board, etc., in a favorable manner so long as its width W and height H meet the condition of "Height H/Width W≤1.70." Also considering that the self-alignment effects of all pieces of Samples No. 2 to No. 7 are "Very effective" (O), the capacitor can be mounted on a circuit board, etc., in a more favorable manner so long as its width W and height H meet the condition of "Height H/Width W≤1.60."

It should be noted that, with Samples No. 2 to No. 8, the length Le of the part of each external electrode 12 covering parts of the four side faces of the capacitor body 11 is 250 μm; however, the aforementioned self-alignment effect depends primarily on the deposit profile of solder on the end face of each external electrode 12 and therefore a similar self-alignment effect can be achieved even when the length Le is changed to a value other than 250 μm.

In summary, the multilayer ceramic capacitor 10-1 shown in FIG. 1 to FIG. 3 is effective in achieving lager capacitance, and it can also be mounted in a circuit board, etc., in a favorable manner on the basis of improved bending strength BS and self-alignment effect, so long as its width W and height H meet the condition of "1.10≤Height H/Width W≤1.70." In addition, meeting of the condition of "1.30≤Height H/Width W≤1.60" by its width W and height H not only makes the capacitor effective in achieving larger capacitance, but allows it to be mounted on a circuit board, etc., in a more favorable manner, as well.

Second Embodiment

FIG. 8 shows a multilayer ceramic capacitor 10-2 to which the present invention is applied (second embodiment). This multilayer ceramic capacitor 10-2 is different from the multilayer ceramic capacitor 10-1 shown in FIG. 1 to FIG. 3 (first embodiment) in that the capacitive part 11a, first protective part 11b, and second protective part 11c of the capacitor body 11 meet the condition of "Thickness T3 of the second protective part 11c>Thickness T2 of the first protective part 11b," or more specifically the condition of "Thickness T1 of the capacitive part 11a>Thickness T3 of the second protective part 11c>Thickness T2 of the first protective part 11b." The remainder of the constitution is the same as with the multilayer ceramic capacitor 10-1 shown in FIG. 1 to FIG. 3, and therefore not explained.

The multilayer ceramic capacitor 10-2 shown in FIG. 8 meets the condition of "1.18≤Thickness T3/Thickness T2≤4.36," or preferably the condition of "2.18≤Thickness T3/Thickness T2≤3.64." In addition, the multilayer ceramic capacitor 10-2 shown in FIG. 8 meets the condition of "0.028≤(Thickness T3−Thickness T2)/Height H≤0.350," or preferably the condition of "0.159≤(Thickness T3−Thickness T2)/Height H≤0.297." The significance of these conditions will be described in detail later.

FIG. 9 shows the specifications and characteristics (bending strength BS) of Verification Samples No. 11 to No. 23. For the purpose of comparison, FIG. 9 also shows the specifications and characteristics (bending strength BS) of Sample No. 2 shown in FIG. 4, in addition to those of Samples No. 11 to No. 23. These Samples No. 11 to No. 23 were all produced according to the aforementioned manufacturing example (refer to the "First Embodiment" section), meaning that the primary component of the internal electrode layer 11a1 in the capacitive part 11a is nickel, while the primary component of the ceramic layer 11a2 in the capacitive part 11a and of the first protective part 11b and second protective part 11c is barium titanate, and each external electrode 12 has a triple-layer structure comprising a base film whose primary component is nickel, intermediate film whose primary component is copper, and surface film whose primary component is tin.

Samples No. 11 to No. 23 are identical in that the length L is 1000 µm; width W is 500 µm; thickness T1 of the capacitive part 11a is 370 µm; sum of the number of internal electrode layers 11a1 and ceramic layers 11a2 in the capacitive part 11a (value shown at the center in the layer constitution LC field) is 43; thickness T2 of the first protective part 11b is 88 µm; number of ceramic layers comprising the first protective part 11b (value shown on the left side in the layer constitution LC field) is 11; thickness Ti of the internal electrode layer 11a1 in the capacitive part 11a is 1.0 µm; thickness Td of the ceramic layer 11a2 in the capacitive part 11a, thickness Td of the ceramic layer constituting the first protective part 11b, and thickness Td of the ceramic layer constituting the second protective part 11c, are all 8.0 µm; thickness of each external electrode 12 is 10 µm; and length Le of the part covering parts of the four side surfaces of the capacitor body 11 (refer to FIG. 8) is 250 µm; however, the thickness T3 of the second protective part 11c and the height H increase gradually as the value shown on the right side in the layer constitution LC field (number of ceramic layers constituting the second protective part 11c) is increased.

The description (n1–m–n2) in the layer constitution LC field shown in FIG. 4, and the method for measuring the bending strength BS, are the same as described in the "First Embodiment" section and therefore not explained here.

In other words, Samples No. 11 to No. 23 meet the condition of "Height H>Width W" as well as the condition of "Thickness T3>Thickness T2," and therefore represent a multilayer ceramic capacitor corresponding to the multilayer ceramic capacitor 10-2 shown in FIG. 8.

The following explains the effects that can be achieved by the multilayer ceramic capacitor 10-2 shown in FIG. 8 by taking into account the specifications and characteristics (bending strength BS) shown in FIG. 9.

First, the bending strengths BS of Samples No. 11 to No. 23 are better than the bending strength BS of Sample No. 2 shown in FIG. 9. When the thickness T2 of the first protective part 11b and thickness T3 of the second protective part 11c are concerned after taking into account that Samples No. 11 to No. 23 all meet the condition of "1.10≤Height H/Width W≤1.70" mentioned at the end of the "First Embodiment" section, it can be said that, so long as the thickness T2 and thickness T3 meet the condition of "1.18≤Thickness T3/Thickness T2≤4.36," the capacitor is effective in achieving larger capacitance and can also be mounted on a circuit board, etc., in a favorable manner.

In addition, when the thickness T2 of the first protective part 11b and thickness T3 of the second protective part 11c are concerned after taking into account that, among Samples No. 11 to No. 23, Samples No. 15 to No. 20 all meet the condition of "1.30≤Height H/Width W≤1.60" mentioned at the end of the "First Embodiment" section, it can be said that, so long as the thickness T2 and thickness T3 meet the condition of "2.18≤Thickness T3/Thickness T2≤3.64," the capacitor is effective in achieving larger capacitance and can also be mounted on a circuit board, etc., in a more favorable manner.

Second, when the thickness T2 of the first protective part 11b, thickness T3 of the second protective part 11c, and height H are concerned after taking into account that Samples No. 11 to No. 23 all meet the condition of "1.10≤Height H/Width W≤1.70" mentioned at the end of the "First Embodiment" section, it can be said that, so long as the thickness T2, thickness T3, and height H meet the condition of "0.028≤(Thickness T3−Thickness T2)/Height H≤0.350," the capacitor is effective in achieving larger capacitance and can also be mounted on a circuit board, etc., in a favorable manner.

Also, when the thickness T2 of the first protective part 11b, thickness T3 of the second protective part 11c, and height H are concerned after taking into account that, among Samples No. 11 to No. 23, Samples No. 15 to No. 20 all meet the condition of "1.30≤Height H/Width W≤1.60" mentioned at the end of the "First Embodiment" section, it can be said that, so long as the thickness T2, thickness T3, and height H meet the condition of "0.159≤(Thickness T3−Thickness T2)/Height H≤0.297," the capacitor is effective in achieving larger capacitance and can also be mounted on a circuit board, etc., in a more favorable manner.

Other Embodiments (1) While Samples No. 2 to No. 10 shown in FIG. 4 and Samples No. 11 to No. 23 shown in FIG. 9 have a thickness Ti of 1.0 µm for the internal electrode layer 11a1 in the capacitive part 11a, effects similar to those mentioned above can also be achieved when the thickness Ti of the internal electrode layer 11a1 is more than 1.0 µm or less than 1.0 µm. In addition, adjusting the thickness Td of the ceramic layer 11a2 in the capacitive part 11a to less than 8.0 µm while also increasing the number of layers (number of internal electrode layers 11a1) in the capacitive part 11a contributes further to capacitance increase.

(2) While the multilayer ceramic capacitor 10-1 shown in FIG. 1 to FIG. 3 and multilayer ceramic capacitor 10-2 shown in FIG. 8 meet the condition of "Length L>Height H>Width W," effects similar to those mentioned above can be achieved regardless of the dimensional relationship of length L and height H, so long as at least "Height H>Width W" is met.

DESCRIPTION OF THE SYMBOLS 10-1, 10-2 - - - Multilayer ceramic capacitor, 11 - - - Capacitor body, 11a - - - Capacitive part, 11a1 - - - Internal electrode layer, 11a2 - - - Ceramic layer, 11b - - - First protective part, 11c - - - Second protective part, 12 - - - External electrode, L - - - Length of the multilayer ceramic capacitor, W - - - Width of the multilayer ceramic capacitor, H - - - Height of the multilayer ceramic capacitor, T1 - - - Thickness of the capacitive part of the capacitor body, T2 - - - Thickness of the first protective part of the capacitor body, T3 - - - Thickness of the second protective part of the capacitor body.

What is claimed is:
1. A multilayer ceramic capacitor having a capacitor body of laminate structure and a pair of external electrodes, and shaped roughly as a rectangular solid defined by a length L, width W, and height H, wherein the width W and height H meet a condition of "1.30≤H/W≤1.60", wherein the capacitor body has a capacitive part where multiple internal electrode layers are stacked with ceramic layers in between, a first protective part made of ceramics, and a second protective part made of ceramics, which are layered in an order of first protective part—capacitive part—second protective part in a height direction, and when a thickness of the first protective part of the capacitor body is given by T2 and a thickness of the second protective part is given by T3, then the thickness T2 and thickness T3 meet a condition of "2.18≤T3/T2≤3.64".

2. A multilayer ceramic capacitor according to claim 1, wherein the capacitor body has a capacitive part where multiple internal electrode layers are stacked with ceramic layers in between, a first protective part made of ceramics, and a second protective part made of ceramics, which are layered in an order of first protective part—capacitive part—second protective part in a height direction, and when a thickness of the first protective part of the capacitor body is given by T2 and a thickness of the second protective part is given by T3, then the thickness T2, thickness T3, and height H meet a condition of "0.028≤(T3−T2)/H≤0.350".

3. A multilayer ceramic capacitor according to claim 1, wherein the length L, width W, and height H meet a condition of "L>H>W".

4. A multilayer ceramic capacitor having a capacitor body of laminate structure and a pair of external electrodes, and shaped roughly as a rectangular solid defined by a length L, width W, and height H, wherein the width W and height H meet a condition of "1.30≤H/W≤1.60", wherein the capacitor body has a capacitive part where multiple internal electrode layers are stacked with ceramic layers in between, a first protective part made of ceramics, and a second protective part made of ceramics, which are layered in an order of first protective part—capacitive part—second protective part in a height direction, and when a thickness of the first protective part of the capacitor body is given by T2 and a thickness of the second protective part is given by T3, then the thickness T2 and thickness T3 meet a condition of "1.18≤T3/T2≤4.36", and wherein the capacitor body has a capacitive part where multiple internal electrode layers are stacked with ceramic layers in between, a first protective part made of ceramics, and a second protective part made of ceramics, which are layered in an order of first protective part—capacitive part—second protective part in a height direction, and when a thickness of the first protective part of the capacitor body is given by T2 and a thickness of the second protective part is given by T3, then the thickness T2, thickness T3, and height H meet a condition of "0.159≤(T3−T2)/H≤0.297".

5. A multilayer ceramic capacitor according to claim 4, wherein the length L, width W, and height H meet a condition of "L>H>W".

* * * * *